US009933855B2

(12) United States Patent
Ferens et al.

(10) Patent No.: US 9,933,855 B2
(45) Date of Patent: Apr. 3, 2018

(54) AUGMENTED REALITY IN A FIELD OF VIEW INCLUDING A REFLECTION

(71) Applicant: Intel Corporation, Santa Clara, CA (US)

(72) Inventors: Ron Ferens, Ramat Hasharon (IL); Barak Hurwitz, Kibbutz Alonim (IL); Camila Dorin, Tel Aviv (IL); Gila Kamhi, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/087,478

(22) Filed: Mar. 31, 2016

(65) Prior Publication Data

US 2017/0285345 A1    Oct. 5, 2017

(51) Int. Cl.
| | | |
|---|---|---|
| *G02B 27/01* | (2006.01) | |
| *G06K 9/00* | (2006.01) | |
| *G06F 3/01* | (2006.01) | |
| *G06T 11/00* | (2006.01) | |
| *G06F 1/16* | (2006.01) | |
| *G06F 3/03* | (2006.01) | |

(52) U.S. Cl.
CPC ........... *G06F 3/017* (2013.01); *G02B 27/017* (2013.01); *G06F 1/163* (2013.01); *G06F 3/011* (2013.01); *G06F 3/0304* (2013.01); *G06K 9/00369* (2013.01); *G06T 11/00* (2013.01); *G02B 2027/014* (2013.01); *G02B 2027/0138* (2013.01); *G06T 2210/16* (2013.01)

(58) Field of Classification Search
CPC ............................ G06F 3/017; G06K 9/00369
USPC ......................................................... 345/633
See application file for complete search history.

(56) References Cited

U.S. PATENT DOCUMENTS

| | | | | |
|---|---|---|---|---|
| 5,563,988 A | * | 10/1996 | Maes ...................... | G06F 3/011 345/421 |
| 6,546,309 B1 | * | 4/2003 | Gazzuolo ........... | G06Q 30/0601 33/512 |

(Continued)

FOREIGN PATENT DOCUMENTS

KR          20150097903 A          8/2015

OTHER PUBLICATIONS

International Search Report and Written Opinion for International Patent Application No. PCT/US2017/020197, dated Jun. 7, 2017, 12 pages.

*Primary Examiner* — Kimberly A Williams
(74) *Attorney, Agent, or Firm* — Jordan IP Law, LLC

(57) ABSTRACT

Systems, apparatuses, and/or methods to augment reality. An object identifier may identify an object in a field of view of a user that includes a reflection of the user from a reflective surface, such as a surface of a traditional mirror. In addition, a reality augmenter may generate an augmented reality object based on the identification of the object. In one example, eyeglasses including a relatively transparent display screen may be coupled with an image capture device on the user and the augmented reality object may be observable by the user on the transparent display screen when the user wears the eyeglasses. A localizer may position the augmented reality object on the transparent display screen relative to the reflection of the user that passes though the transparent display screen during natural visual perception of the reflection by the user.

15 Claims, 4 Drawing Sheets

(56) References Cited

U.S. PATENT DOCUMENTS

| | | | |
|---|---|---|---|
| 8,824,749 B2* | 9/2014 | Leyvand | G06K 9/00221 |
| | | | 382/100 |
| 2011/0298897 A1* | 12/2011 | Sareen | G06N 3/006 |
| | | | 348/47 |
| 2012/0050144 A1 | 3/2012 | Morlock | |
| 2012/0113223 A1* | 5/2012 | Hilliges | G06F 3/00 |
| | | | 348/46 |
| 2013/0050432 A1* | 2/2013 | Perez | H04N 13/0278 |
| | | | 348/47 |
| 2013/0229482 A1* | 9/2013 | Vilcovsky | H04N 7/144 |
| | | | 348/14.07 |
| 2014/0168217 A1* | 6/2014 | Kim | G06T 13/40 |
| | | | 345/420 |
| 2014/0226000 A1* | 8/2014 | Vilcovsky | G06F 3/017 |
| | | | 348/77 |
| 2014/0361988 A1 | 12/2014 | Katz et al. | |
| 2015/0279117 A1* | 10/2015 | Schimke | G06F 3/0482 |
| | | | 345/633 |
| 2016/0035133 A1 | 2/2016 | Ye et al. | |
| 2016/0063327 A1 | 3/2016 | Yasutake | |
| 2017/0206691 A1* | 7/2017 | Harrises | G06T 11/60 |

* cited by examiner

AUGMENTED REALITY IN A FIELD OF VIEW INCLUDING A REFLECTION

TECHNICAL FIELD

Embodiments generally relate to augmented reality. More particularly, embodiments relate to augmented reality in a field of view including a reflection.

BACKGROUND

Systems that provide smart mirror functionality may include relatively sophisticated display technologies with sensors. For example, a touch screen smart mirror may include a three-dimensional (3D) camera, a multispectral camera, facial recognition components, gas sensors, and so on. In one system, a transparent organic light-emitting diode (OLED) display including a relatively high reflectance may provide virtual fitting room functionality. Other systems may improve an appearance of a user, may provide a health report based on a minute-long analysis of a face, and so on. The cost of such systems, however, may be orders of magnitude greater than a traditional mirror due to enhanced mirror or display technologies. Thus, there is significant room for improvement to provide smart mirror functionality for reality augmentation.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1A:
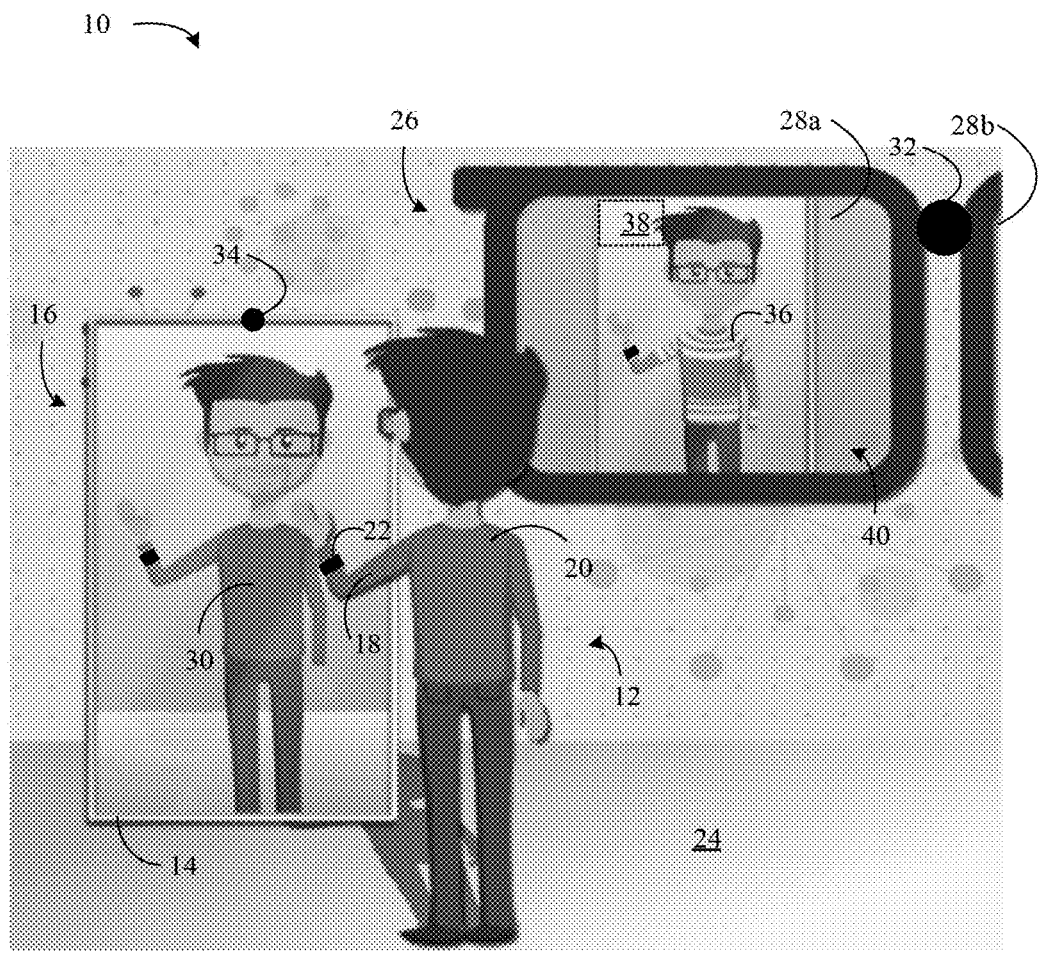
FIGS. 1A-1B are illustrations of an example of an approach to augment reality using eyeglasses and a traditional mirror according to an embodiment.
Figure 1B:
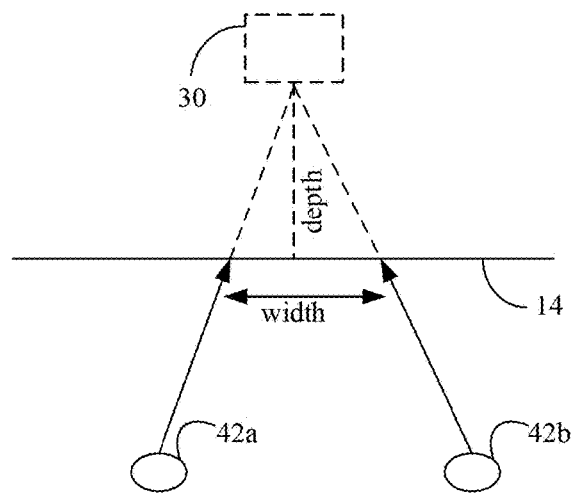

Turning now to FIGS. 1A-1B, an approach 10 is shown to augment reality according to an embodiment. As illustrated in FIG. 1A, a user 12 stands in front of a reflective surface 14 of a traditional mirror 16 and performs a gesture including raising an arm 18, which is covered by a sleeve of a garment 20 and which is coupled with a wearable device 22. The garment 20 includes a sweater that lacks a pattern (e.g., interwoven, printed, stitched, etc.) and the wearable device 22 includes a smart watch that provides sensor data for the user 12, the wearable device 22, and/or an environment 24 (e.g., a room, etc.). The wearable device 22 may, for example, provide gas sensor data for the user 12, pulse sensor data for the user 12, blood pressure data for the user 12, acceleration data for the user 12 and/or the wearable device 22, orientation data for the user 12 and/or the wearable device 22, temperature data for the user 12 and/or the environment 24, location data for the user 12, the wearable device 22, and/or the environment 24, and so on.

The user 12 wears eyeglasses 26 that include a transparent display screen 28 (28a-28b) through which images of objects pass to eyes of the user 12 during natural visual perception of the objects by the user 12. The transparent display screen 28 may include, for example, a transparent organic light-emitting diode (OLED) display screen having a relatively low reflectance. The eyeglasses 26 further include an image capture device 32, which may include a two-dimensional (2D) camera, a three-dimensional (3D) camera, a multispectral camera, a thermal camera, and so on. In the illustrated example, the image capture device 32 includes a range camera (e.g., an RGB-D camera, etc.) to generate image data (e.g., RGB data, etc.) and/or depth data (e.g., pixel depth data, etc.) for objects in a field of view of the image capture device 32. Image data and/or depth data may be generated based on, for example, stereo triangulation, sheet of light triangulation, structured light, time-of-flight, interferometry, coded aperture, and so on.

In the illustrated example, the mirror 16 also includes an image capture device 34 that faces the user 12 to generate image data and/or depth data for objects in a field of view of the image capture device 34. Notably, the image capture device 34 may track objects inside and/or outside of the field of view of the image capture device 32 to provide an expanded field of view to track gestures and/or to supplement egocentric viewpoints. Moreover, synchronization between the data generated by the image capture devices 32, 34 when the user 12 moves may provide a correspondence between the data to minimize issues involving usability from delays and/or to maximize accuracy of augmented reality functionality. For example, the image capture device 34 may forward a message (e.g., metadata notifying of a gesture, image data, depth data, etc.) to indicate a gesture has been observed that may be utilized to validate a gesture observed by the image capture device 32, to supplement data generated by the image capture device 32 in response to a gesture, and so on.

Objects in a field of view of the user 12 and/or in a field of view of the image capture devices 32, 34 may be identified. For example, a virtual object corresponding to the reflection 30 in the field of view of the user 12 may be identified. In one example, a device on the user 12 may be identified based on feature data (e.g., a wristband, a form-factor, etc.) from the reflection 30. The face of the user 12 may also be identified based on feature data (e.g., eyes, nose, mouth, etc.) from the reflection 30. Moreover, a body position of the user 12 may be identified based on skeletal data (e.g., "tracked" skeleton data, "position only" skeleton data, etc.) from the reflection 30. The reflection 30 may also be used to identify a gesture made by the user 12 based on feature data, skeletal data, gesture data (e.g., finger/hand potion, etc.), and so on.

Similarly a real object in a field of view of the user 12 and/or in a field of view of the image capture device 32 may be identified, such as the mirror 16. Moreover, a real object in a field of view of the image capture device 34, such as the user 12 and/or the wearable device 22, may be identified. In addition, an object may be identified based on sensor data. For example, an object may be identified based on a type of sensor data available from a particular object, acceleration data for a particular object, and so on. An object may also be identified based on identification data such as a device name, a device logo, a device address (e.g., Media Access Control address, etc.), and so on.

In the illustrated example, objects in a field of view of the user 12 may be augmented with augmented reality (AR) objects 36, 38. In one example, the reflection 30 may be augmented with the AR object 36 (e.g., printed pattern, color change, etc.) based on an identification of the garment 20 as a sweater from the reflection 30. For example, the garment 20 in the reflection 30 may be augmented with the AR object 36 so that the user 12 observes an augmented sweater (e.g., a sweater with a printed pattern, etc.) when the eyeglasses 26 are worn by the user 12. Moreover, an identification of the arm 18 and/or the body position of the user 12 may allow the AR object 36 to be properly positioned when the user 12 moves. In this regard, synchronization among the image capture devices 32, 34 may facilitate object recognition, AR object positioning, etc.

In another example, a real object in a field of view of the user 12 may be augmented by the AR object 38 (e.g., a GUI for a menu, a 2D notation such as user weight, steps taken, etc.). For example, a simultaneous localization and mapping (SLAM) process may be implemented to augment the mirror 16 in the field of view of the user 12 with the AR object 38. A map of a scene 40 may, for example, be generated from image data (e.g., a video frame, etc.) generated by the image capture device 32. A feature in the scene 40, such as a top left corner of the mirror 16, may be extracted from the image data and a displacement of the feature (e.g., dx/dy, etc.) may be determined when the user 12 moves. The position of the user 12, such as the position of the reflection 30, in the scene 40 may be determined based on the displacement of the feature, and the AR object 38 may be displaced proportional to the displacement of the user 12 to position the AR object 38 at the same location in the scene 40 when the user 12 moves.

As illustrated in FIG. 1B, 3D perception of the image capture device 32 may not be compromised by the 2D nature of the surface 14 of the mirror 16. For example, two sensors of the image capture device 32 may capture the scene 40 in a slightly different perspective 42 (42a-42b) that allows depth extraction processes to determine actual depth of the scene 40. The surface 14 may be set as the image surface by the location of the mirror 16, and a virtual object corresponding to the reflection 30 will appear when the user 12 stands in front of the mirror 16 to be captured by the image capture device 32 at the two different perspectives 42a, 42b. Thus, the image capture device 32 provides 3D functionality based on the reflection 30 even when used alone.

Moreover, passage of the reflection 30 and/or images of real objects in the scene 40 thorough the transparent display screen 28 may minimize a need for sophisticated display technologies and/or may minimize computational requirements for augmenting reality. The AR elements 36, 38 may, for example, be positioned relative to the reflection 30 and/or relative to the images of the real objects passing through the transparent display screen 28 to minimize display computations and/or pixel usage.

While examples have provided various functionality of the approach 10 for illustration purposes, it should be understood that one or more functions of the approach 10 may reside in the same and/or different physical and/or virtual computing platform locations, may be combined, omitted, bypassed, re-arranged, and/or be utilized in any order. The eyeglasses 26 may, for example, provide one or more AR functions of the approach 10. In addition, functions of the approach 10 may be distributed among various computing platforms to provide distributed AR functionality. Moreover, any or all functions of the approach 10 may be automatically implemented (e.g., without human intervention, etc.). For example, objects in a field of view may be automatically identified when data from an image capture device is obtained.

Figure 2:
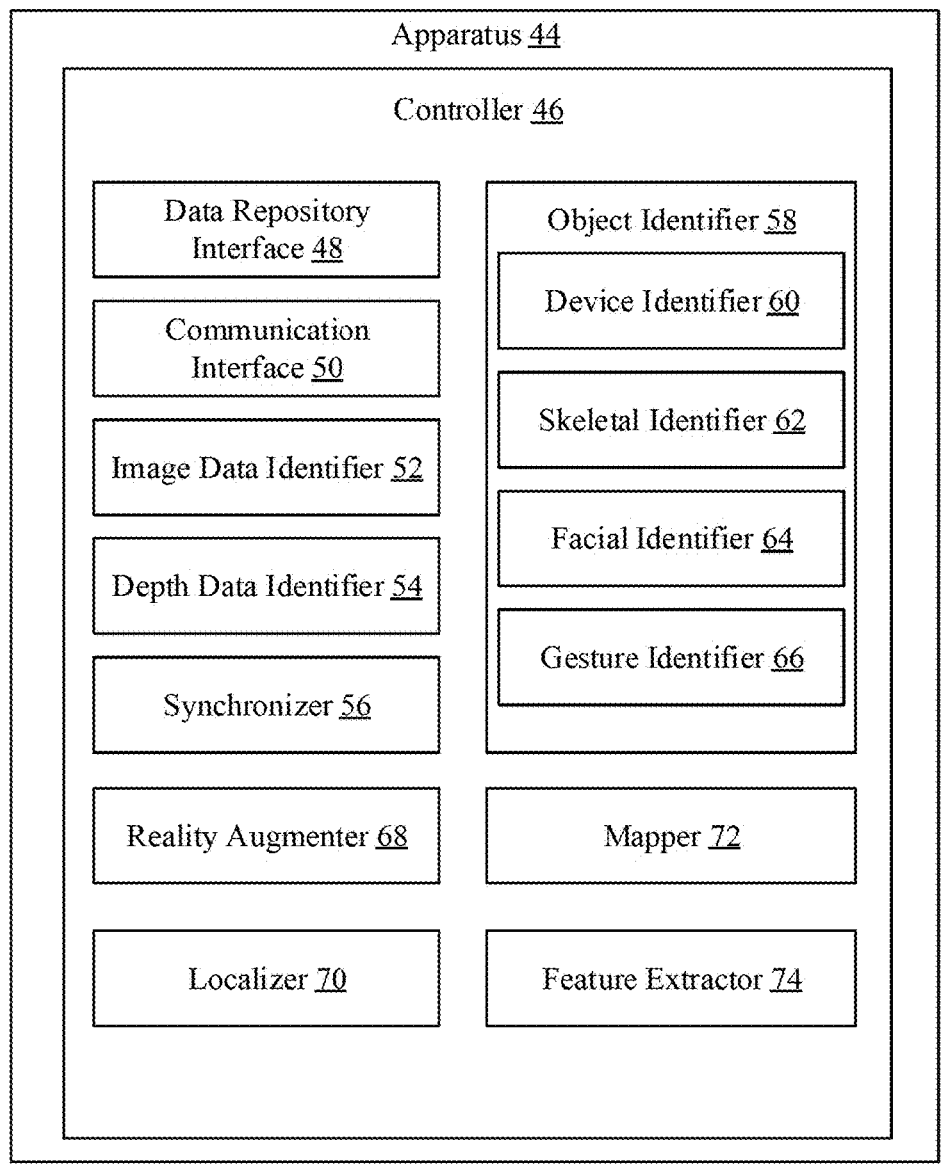
FIG. 2 is an illustration of an example of an apparatus to augment reality according to an embodiment.

FIG. 2 shows an apparatus 44 to augment reality according to an embodiment. The apparatus 44 may include a computing platform such as, for example, a laptop, personal digital assistant (PDA), media content player, imaging device, mobile Internet device (MID), any smart device such as a wireless smart phone, smart tablet, smart TV, smart watch, eyewear, computer server, gaming platform, etc. The apparatus 44 may also include logic (e.g., logic instructions, configurable logic, fixed-functionality logic hardware, etc.) configured to implement any of the herein mentioned technologies including, for example, the approach 10 (FIGS. 1A-1B), discussed above. For example, a controller 46 may receive data corresponding to a reflection of a user from a traditional mirror and augment an object in a field of view with an augmented reality (AR) object.

The controller 46 includes a data repository interface 48 that may interface with memory (e.g., cache, random access memory, etc.), with a hard drive (e.g., on-platform storage, removable storage, etc.), and so on. The controller 46 also includes a communication interface 50 that may interface with communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LiFi (Light Fidelity, e.g., Institute of Electrical and Electronics Engineers/IEEE 802.15-7, Wireless Local Area Network/LAN Medium Access Control (MAC) and Physical Layer (PHY) Specifications), 4G LTE (Fourth Generation Long Term Evolution), Bluetooth (e.g., Institute of Electrical and Electronics Engineers/IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), NFC (Near Field Communication, ECMA-340, ISO/IEC 18092), and other radio frequency (RF) purposes. Thus, the controller 46 may utilize the data repository interface 48 to store, and/or may utilize the communication interface 50 to forward, image data, depth data, object identification data, AR object data, and so on.

The controller 46 further includes an image data identifier 52 to identify image data. For example, the image data identifier 52 may identify RGB data from an RGB-D camera corresponding to a reflection of a user. The image data identifier 52 may also identify RGB data from an RGB-D camera corresponding to an image of a real object in a field of view (e.g., of the user, etc.). The controller 46 further includes a depth data identifier 54 to identify depth data. For example, the depth data identifier 54 may identify pixel depth data from an RGB-D camera corresponding to a reflection of a user. The depth data identifier 54 may also identify depth pixel data generated by an RGB-D camera corresponding to an image of a real object in a field of view.

The controller 46 further includes a synchronizer 56 to synchronize data from an image capture device that faces a user with data from an image capture device on the user that faces away from the user. For example, the synchronizer 56 may synchronize data from an RGB-D camera located on a mirror that faces a user with data from an RGB-D camera on eyeglasses worn by the user. Image data and/or depth data that is synchronized may facilitate object identification for several purposes such as object recognition, gesture recognition, feature extraction, AR object positioning, and so on.

The controller 46 further includes an object identifier 58 to identify an object in a field of view of a user, of an image capture device on the user that provides an egocentric viewpoint of objects, and/or of an image capture device that faces the user and provides an expanded field of view to track gestures and/or to supplement egocentric viewpoints. For example, an image capture device on a user may provide an egocentric viewpoint of a user reflection to be used by the object identifier 58 to identify a virtual object, may provide an egocentric viewpoint of a mirror to be used by the object identifier 58 to identify a real object, and so on. The object identifier 58 may also identify a real objet in a field of view of an image capture device that faces the user to supplement an egocentric viewpoint with a user-facing viewpoint.

In the illustrated example, the object identifier 58 includes a device identifier 60 to identify a device on a user. For example, the device identifier 60 may identify a device (e.g., a smart watch, etc.) that the user is wearing. The object identifier 58 further includes a skeletal identifier 62 to identify a body position of a user. For example, the skeletal identifier 62 may identify a position of joints of the user's body (e.g., "tracked" position, etc.). Moreover, the object identifier 58 includes a facial identifier 64 to identify a face of a user. For example, the facial identifier 64 may identify a nose of the user, a lip of the user, hair of the user, and so on. The object identifier 58 further includes a gesture identifier 66 to identify a gesture by a user. For example, the gesture identifier 66 may identify a facial gesture movement by the user (e.g., a smile, etc.), a hand or finger gesture movement by the user (e.g., a thumbs-up, etc.), an arm gesture movement by the user (e.g., waive, etc.), and so on.

The controller 46 further includes a reality augmenter 68 to generate an AR object based on, for example, an identification of an object in a field of view. The reality augmenter 68 may, for example, generate an augmented facial appearance (e.g., facial hair deletion, eye color change, etc.) for a reflection based on an identification of a face of a user from the reflection. The reality augmenter 68 may further, for example, generate an augmented clothing appearance (e.g., different pants, etc.) for a reflection based on an identification of a garment of a user from the reflection. The reality augmenter 68 may further, for example, generate an augmented wall appearance (e.g., a GUI, data from a wearable device, data for the environment, etc.) for an image of a wall based on an identification of the wall from the image of the wall.

The controller 46 further includes a localizer 70 to determine a position of an AR object that is to be rendered on a display screen. The localizer 70 may position an AR object relative to a reflection and/or relative to an image of a real object in a field of view of a user that passes through a transparent display screen to eyes of the user during natural visual perception of the refection and/or of the image. The localizer 70 may position an AR object on a reflection of a user based on image data and/or depth data, from an RGB-D camera, associated with an object identified from the reflection during an object recognition process. The localizer 70 may further position an AR object on an image of a real object (e.g., a wall, another person, etc.) based on image data and/or depth data, from an RGB-D camera, associated with an object identified from the image of the real object during an object recognition process.

The localizer 70 may also position an AR object on an image of an object based on image data and/or depth data, from an RGB-D camera, associated with a feature extracted from an image during a SLAM process. In the illustrated example, the controller 44 includes a mapper 72 to generate a map from image data of a scene and a feature extracter 74 to extract a feature from the image data of the scene. The localizer 70 may then position a user in the map based on a displacement of the feature in the map and position the AR object in the map based on the position of the user. Thus, the AR object may be displaced proportional to the displacement of the user to position the AR object at the same location in the scene when the user moves.

While examples have provided various components of the apparatus 44 for illustration purposes, it should be understood that one or more components of the apparatus 44 may reside in the same and/or different physical and/or virtual computing platform locations, may be combined, omitted, bypassed, re-arranged, and/or be utilized in any order. In one example, one or more components of the controller 46 may physically reside on the same computing platform. In another example, one or more components of the controller 46 may be distributed among various computing platforms to provide distributed reality augmentation functionality. Moreover, any or all components of the apparatus 44 may be automatically implemented (e.g., without human intervention, etc.). For example, the object identifier 58 may be automatically implemented when data from an image capture device is obtained.

Figure 3:
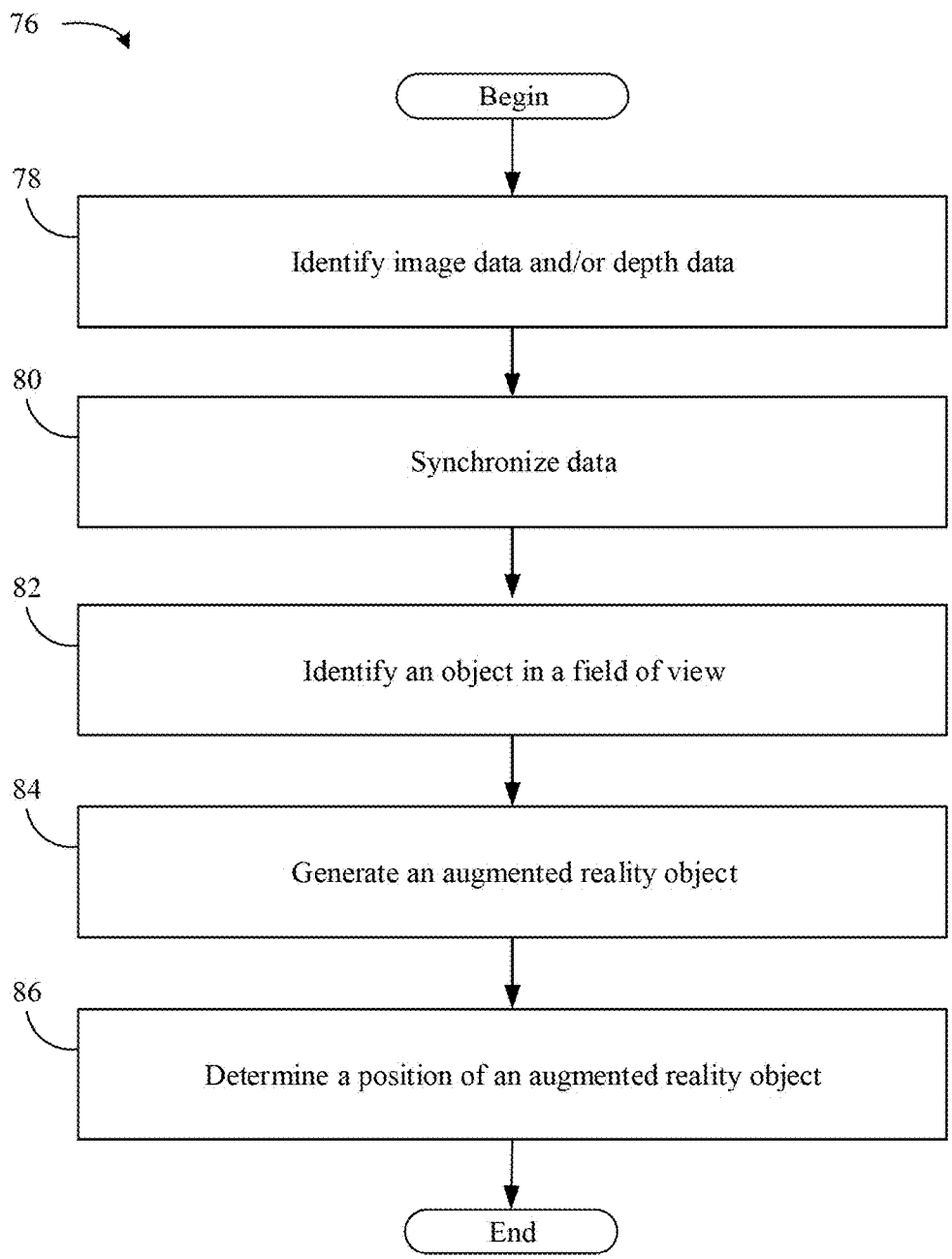
FIG. 3 is an illustration of an example of a method to augment reality according to an embodiment.

Turning now to FIG. 3, a method 76 is shown to augment reality according to an embodiment. The method 76 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 76 may be written in any combination of one or more programming languages, including an object oriented programming language such as JAVA, SMALLTALK, C++ or the like and conventional procedural programming languages, such as the "C" programming language or similar programming languages.

Illustrated block 78 provides for identifying image data and/or depth data. Block 78 may, for example, identify RGB data from an RGB-D camera corresponding to a reflection of a user, corresponding to an image of a real object in a field of view (e.g., of the user, etc.), and so on. Block 78 may further, for example, identify depth pixel data from an RGB-D camera corresponding to a reflection of a user, corresponding to an image of a real object in a field of view (e.g., of the user, etc.), and so on.

Illustrated block 80 provides for synchronizing data. Block 80 may, for example, synchronize data from an image capture device that faces a user with data from an image capture device on the user that faces away from the user. Illustrated processing block 82 provides for identifying an object in a field of view. Block 82 may, for example, identify an object in a field of view of a user, in a field of view of an image capture device on a user that provides an egocentric viewpoint of objects, and/or in a field of view of an image capture device that faces a user to provide an expanded field of view to track gestures and/or to supplement egocentric viewpoints. In one example, block 82 may identify a device on a user, identify a body position of a user, identify a face of a user, identify a gesture by a user, and so on.

Illustrated processing block 84 provides for generating an augmented reality (AR) object. Block 84 may, for example, generate an AR object based on an identification of an object in a field of view. In one example, block 84 may generate an augmented virtual object appearance for a reflection based on identification of, e.g., a face of a user from the reflection. In another example, block 84 may generate an augmented real object appearance for an image of a real object in a field of view of a user based on identification of, e.g., a wall from an image of the wall.

Illustrated block 86 provides for determining a position of an AR object that is to be rendered on a display screen, which may include a transparent OLED display screen. Block 86 may, for example, position an AR object relative to a reflection and/or relative to an image of a real object in a field of view of a user that passes through the OLED display screen to eyes of the user during natural visual perception of the refection and/or of the image. Block 86 may position an AR object based on image data and/or depth data associated with an object (e.g., a real object, a virtual object such as a reflection, etc.) identified during an object recognition process and/or during a SLAM process. In this regard, block 86 may generate a map from image data of a scene, extract a feature from the image data of the scene, position a user in the map based on a displacement of the feature in the map, and position the augmented reality object in the map based on the position of the user.

Block 86 may, for example, position an AR object on the OLED display screen to be in register with a reflection of a user based on image data and/or depth data corresponding to the reflection of the user. In one example, the AR object may be an augmentation to a garment of the user and block 86 may position an AR element that augments the garment in register with the reflection of the garment traversing the OLED display screen. Block 86 may further, for example, position an AR object on the OLED display screen to be in register with an image of a real object based on image data and/or depth data corresponding to the image of the real object. In one example, the AR object may be an augmentation to a mirror, a wall, etc., of an environment in which the user is located and block 86 may position an AR element that augments the mirror, etc., in register with the image of the mirror, etc., traversing the OLED display screen.

While independent blocks and/or a particular order has been shown for illustration purposes, it should be understood that one or more of the blocks of the method 76 may be combined, omitted, bypassed, re-arranged, and/or flow in any order. Moreover, any or all blocks of the method 76 may be automatically implemented (e.g., without human intervention, etc.). For example, block 82 may automatically identify an object in a field of view when data from an image capture device is obtained.

Figure 4:
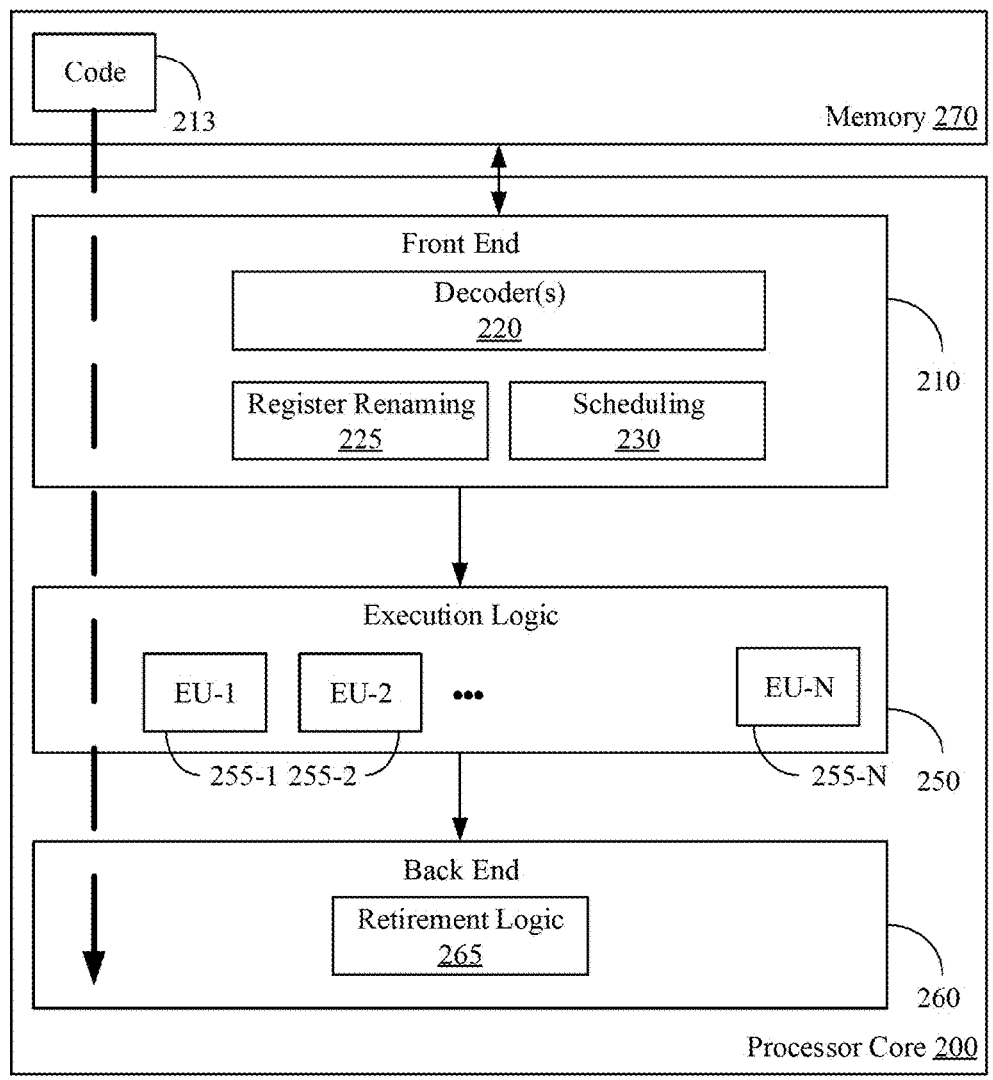
FIG. 4 is a block diagram of an example of a processor according to an embodiment.

FIG. 4 shows a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the approach 10 (FIG. 1), the apparatus 44 (FIG. 2), and/or the method 76 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Additional Notes and Examples

Example 1 may include a system to augment reality comprising eyeglasses including a transparent display screen that are to be coupled with an image capture device on a user and a reality augmenter to automatically generate an augmented reality object based on an identification of an object in a field of view of the user that is to include a reflection of the user from a reflective surface, wherein the augmented reality object is to be observable by the user on the transparent display screen when the user wears the eyeglasses.

Example 2 may include the system of Example 1, further including an image capture device that is to face the user and a synchronizer to synchronize data from an image capture device that is to face the user with data from the image capture device on the user.

Example 3 may include the system of any one of Examples 1 to 2, further including a localizer to position the augmented reality object on the transparent display screen relative to the reflection of the user that is to pass though the transparent display screen.

Example 4 may include an apparatus to augment reality comprising an object identifier to automatically make an identification of an object in a field of view of a user that is to include a reflection of the user from a reflective surface and a reality augmenter to automatically generate an augmented reality object based on the identification of the object.

Example 5 may include the apparatus of Example 4, further including an image capture device on the user to capture the reflection of the user.

Example 6 may include the apparatus of any one of Examples 4 to 5, further including an image data identifier to identify image data for the reflection of the user and a depth data identifier to identify depth data for the reflection of the user.

Example 7 may include the apparatus of any one of Examples 4 to 6, further including a device identifier to identify a device on the user, a skeletal identifier to identify a body position of the user, a facial identifier to identify a face of the user, and a gesture identifier to identify a gesture by the user.

Example 8 may include the apparatus of any one of Examples 4 to 7, further including a mapper to generate a map from image data of a scene, a feature extractor to extract a feature from the image data of the scene, and a localizer to position the user in the map based on a displacement of the feature in the map, and position the augmented reality object in the map based on the position of the user.

Example 9 may include the apparatus of any one of Examples 4 to 8, further including a synchronizer to synchronize data from an image capture device that is to face the user with data from an image capture device on the user.

Example 10 may include the apparatus of any one of Examples 4 to 9, further including a localizer to position the augmented reality object on a transparent display screen relative to the reflection of the user that is to pass though the transparent display screen.

Example 11 may include at least one computer readable storage medium comprising a set of instructions, which when executed by a processor, cause the processor to automatically make an identification of an object in a field of view of a user that is to include a reflection of the user from a reflective surface and automatically generate an augmented reality object based on the identification of the object.

Example 12 may include the at least one computer readable storage medium of Example 11, wherein the instructions, when executed, cause the processor to capture the reflection of the user.

Example 13 may include the at least one computer readable storage medium of any one of Examples 11 to 12, wherein the instructions, when executed, cause the processor to identify image data for the reflection of the user and identify depth data for the reflection of the user.

Example 14 may include the at least one computer readable storage medium of any one of Examples 11 to 13, wherein the instructions, when executed, cause the processor to identify a device on the user, identify a body position of the user, identify a face of the user, and identify a gesture by the user.

Example 15 may include the at least one computer readable storage medium of any one of Examples 11 to 14, wherein the instructions, when executed, cause the processor to generate a map from image data of a scene, extract a feature from the image data of the scene, position the user in the map based on a displacement of the feature in the map, and position the augmented reality object in the map based on the position of the user.

Example 16 may include the at least one computer readable storage medium of any one of Examples 11 to 15, wherein the instructions, when executed, cause the processor to synchronize data from an image capture device that is to face the user with data from an image capture device on the user.

Example 17 may include the at least one computer readable storage medium of any one of Examples 11 to 16, wherein the instructions, when executed, cause the processor to position the augmented reality object on a transparent display screen relative to the reflection of the user that is to pass though the transparent display screen.

Example 18 may include a method to augment reality comprising automatically making an identification of an object in a field of view of a user that includes a reflection of the user from a reflective surface and automatically generating an augmented reality object based on the identification of the object.

Example 19 may include the method of Example 18, further including capturing the reflection of the user.

Example 20 may include the method of any one of Examples 18 to 19, further including identifying image data for the reflection of the user and identifying depth data for the reflection of the user.

Example 21 may include the method of any one of Examples 18 to 20, further including identifying a device on the user, identifying a body position of the user, identifying a face of the user, and identifying a gesture by the user.

Example 22 may include the method of any one of Examples 18 to 21, further including generating a map from image data of a scene, extracting a feature from the image data of the scene, positioning the user in the map based on a displacement of the feature in the map, and positioning the augmented reality object in the map based on the position of the user.

Example 23 may include the method of any one of Examples 18 to 22, further including synchronizing data from an image capture device that faces the user with data from an image capture device on the user.

Example 24 may include the method of any one of Examples 18 to 23, further including positioning the augmented reality object on a transparent display screen relative to the reflection of the user that is to pass though the transparent display screen.

Example 25 may include an apparatus to augment reality comprising means for performing the method of any one of Examples 18 to 24.

Thus, techniques described herein provide for smart mirror functionality while leveraging from a traditional mirror and 3D enhanced AR glasses. For example, a user may experience augmented reality wearing AR glasses as the user faces a traditional mirror. The AR glasses may not be tied to relatively expensive conventional smart mirror technologies and may be utilized with any reflective surface that provides a reflection. Moreover, the reflective surface may not require embedded sensors since natural relevant content may be rendered to a view of the user through transparent AR glasses with respect to, for example, the reflection of the user. In addition, relatively complex display technologies may not be needed since a reflective surface may be used (e.g., a traditional mirror). The face, skeleton, and/or gesture of a user may be monitored and/or analyzed using the reflection of the user.

In one example where a user stands in front of a mirror wearing AR glasses, the user may see his/her reflection in different cloths and, as the user moves, the augmentation may be rendered in a realistic manner since the user may be tracked and a virtual image (e.g., the reflection) may be augmented based on 3D enhanced object recognition and/or SLAM processes. The mirrored image may be tracked as the user moves in front of the mirror wearing 3D enhanced AR glasses via an RGB-D analysis of the mirrored image, and augmentation based on usage (e.g., an application, etc.) may be provided via 2D and/or 3D data (e.g., date, temperature, mood, health condition, etc.).

A user-facing RGB-D camera may also be used to track acute refined gestures and/or to augment a mirrored image, wherein data from the user-facing RGB-D camera may be synchronized with data from the RGB-D camera on the user. Embodiments also promote usage of multi-modal perceptual computing technologies leveraging from 3D depth computations including facial recognition, skeletal tracking, gesture tracking, etc.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
eyeglasses including a transparent display screen,
a range camera on a user coupled with the eyeglasses to capture image data and depth data for a virtual object in a field of view of the user that is included in a reflection of the user from a reflective surface, wherein the depth data is based on a location of the reflective surface in the field of view of the user that is set as an image surface and a distance of a center line between the image surface and an intersection of the virtual object with a plurality of perspective lines that extend from the image surface to the virtual object,
a reality augmenter to automatically generate an augmented reality object based on an identification of the virtual object, and
a localizer to position the augmented reality object on the transparent display screen relative to the reflection of the user that is to pass though the transparent display screen to allow the augmented reality object to be observable by the user on the transparent display screen when the user wears the eyeglasses.

2. The system of claim 1, further including,
an image capture device that is to face the user, and
a synchronizer to synchronize data from the image capture device that is to face the user with data from the range camera on the user.

3. The system of claim 2, wherein the image capture device that is to face the user is to include a range camera that is to face the user.

4. An apparatus comprising:
an object identifier to automatically make an identification of a virtual object in a field of view of a user that is included in a reflection of the user from a reflective surface,
an image data identifier to identify image data for the virtual object from a range camera on the user,
a depth data identifier to identify depth data for the virtual object from the range camera, wherein the depth data is based on a location of the reflective surface in the field of view of the user that is set as an image surface and a distance of a center line between the image surface and an intersection of the virtual object with a plurality of perspective lines that extend from the image surface to the virtual object,
a reality augmenter to automatically generate an augmented reality object based on the identification of the virtual object, and
a localizer to position the augmented reality object on a transparent display screen of eyeglasses relative to the reflection of the user that is to pass though the transparent display screen to allow the augmented reality object to be observable by the user on the transparent display screen when the user wears the eyeglasses.

5. The apparatus of claim 4, further including,
a device identifier to identify a device on the user,
a skeletal identifier to identify a body position of the user,
a facial identifier to identify a face of the user, and
a gesture identifier to identify a gesture by the user.

6. The apparatus of claim 4, further including,
a mapper to generate a map from image data of a scene, and a feature extractor to extract a feature from the image data of the scene, wherein the localizer is to,
  position the user in the map based on a displacement of the feature in the map, and
  position the augmented reality object in the map based on the position of the user.

7. The apparatus of claim 4, further including a synchronizer to synchronize data from an image capture device that is to face the user with data from an range camera on the user.

8. At least one computer readable storage medium comprising a set of instructions, which when executed by a processor, cause the processor to:
  automatically make an identification of a virtual object in a field of view of a user that is included in a reflection of the user from a reflective surface;
  automatically identify image data for the virtual object from a range camera on the user;
  automatically identify depth data for the virtual object from the range camera, wherein the depth data is based on a location of the reflective surface in the field of view of the user that is set as an image surface and a distance of a center line between the image surface and an intersection of the virtual object with a plurality of perspective lines that extend from the image surface to the virtual object;
  automatically generate an augmented reality object based on the identification of the virtual object; and
  automatically position the augmented reality object on a transparent display screen of eyeglasses relative to the reflection of the user that is to pass though the transparent display screen to allow the augmented reality object to be observable by the user on the transparent display screen when the user wears the eyeglasses.

9. The at least one computer readable storage medium of claim 8, wherein the instructions, when executed, cause the processor to:
  identify a device on the user;
  identify a body position of the user;
  identify a face of the user; and
  identify a gesture by the user.

10. The at least one computer readable storage medium of claim 8, wherein the instructions, when executed, cause the processor to:
  generate a map from image data of a scene;
  extract a feature from the image data of the scene;
  position the user in the map based on a displacement of the feature in the map; and
  position the augmented reality object in the map based on the position of the user.

11. The at least one computer readable storage medium of claim 8, wherein the instructions, when executed, cause the processor to synchronize data from an image capture device that is to face the user with data from the range camera on the user.

12. A method comprising:
  automatically making an identification of a virtual object in a field of view of a user that is included in a reflection of the user from a reflective surface;
  automatically identifying image data for the virtual object from a range camera on the user;
  automatically identifying depth data for the virtual object from the range camera, wherein the depth data is based on a location of the reflective surface in the field of view of the user that is set as an image surface and a distance of a center line between the image surface and an intersection of the virtual object with a plurality of perspective lines that extend from the image surface to the virtual object;
  automatically generating an augmented reality object based on the identification of the virtual object; and
  automatically positioning the augmented reality object on a transparent display screen of eyeglasses relative to the reflection of the user that is to pass though the transparent display screen to allow the augmented reality object to be observable by the user on the transparent display screen when the user wears the eyeglasses.

13. The method of claim 12, further including:
  identifying a device on the user;
  identifying a body position of the user;
  identifying a face of the user; and
  identifying a gesture by the user.

14. The method of claim 12, further including:
  generating a map from image data of a scene;
  extracting a feature from the image data of the scene;
  positioning the user in the map based on a displacement of the feature in the map; and
  positioning the augmented reality object in the map based on the position of the user.

15. The method of claim 12, further including synchronizing data from an image capture device that faces the user with data from the range camera on the user.

* * * * *